United States Patent Office 3,573,332
Patented Mar. 30, 1971

3,573,332
PREPARATION OF ALIPHATIC ACIDS AND ESTERS
Donald M. Fenton, Anaheim, Calif., assignor to Union Oil Company of California, Los Angeles, Calif.
No Drawing. Filed July 19, 1968, Ser. No. 745,967
Int. Cl. C11e *3/00;* C07c *53/32*
U.S. Cl. 260—408                             5 Claims

ABSTRACT OF THE DISCLOSURE

The telomerization of ethylene in the presence of di- and tri-halo acetic acid and esters thereof is catalyzed by a palladium cyanide containing catalyst to produce chlorinated long-chain fatty acids. These fatty acids are useful for soap or detergent preparations or can be dehydrochlorinated to prepare unsaturated long-chain fatty acids. In a typical reaction, ethylene is contacted with chloroacetic acid and palladium cyanide under liquid phase conditions to prepare dichloro fatty acids.

DESCRIPTION OF THE INVENTION

The invention relates to the preparation of fatty acid derivatives and in particular relates to the preparation of halogenated fatty alkanoic acids.

The invention comprises contacting ethylene with di- or tri-halo acetic acid or esters thereof in the presence of a palladium cyanide containing catalyst to telomerize the ethylene and prepare a chlorinated fatty acid or ester thereof.

The reaction is performed under liquid phase conditions and the reactants can be employed neat or in the presence of a suitable inert solvent. The reaction conditions are relatively mild including temperatures from 30° to 300° C. and pressures from 1 to 100 atmospheres. The reaction time can be from several minutes to 10 hours or more and sufficient time is permitted to insure substantial completion of the reaction as monitored by observation of the pressure decline of the reactants or other variables.

The reaction provides a synthesis of halogenated fatty carboxylic acids or esters thereof of even numbered carbon chains with a chain length from 6 to about 20 carbons. The dehydrohalogenation of these acids or esters provides a synthesis of unsaturated fatty acids of the same chain length, e.g., linoleic, eicosinic, palmitolic, geranic, sorbic acids, etc.

The telomerization of ethylene is performed with a halogenated acetic acid or ester thereof. The acetic acid should have two or three halo substituents and is a di- or tri-halo acetic acid or ester. Examples of suitable reactants include: dichloroacetic acid, chlorobromoacetic acid, dibromoacetic acid, diiodoacetic acid, trichloroacetic acid, dichlorobromoacetic acid, tribromoacetic acid, diiodobromoacetic acid, triiodoacetic acid, etc., as well as the esters thereof with $C_1$ to $C_{12}$ alkyl, cycloalkyl or aryl, monohydroxy compounds, e.g., methyl dichloroacetate, ethyl chlorobromoacetate, isopropyl tribromoacetate, amyl triiodo acetate, amyl dibromochloroacetate, cyclohexyl dichloroacetate, methylcyclopentyl dibromoacetate, ethylcyclohexyl diiodoacetate, heptyl trichloroacetate, 2-ethylhexyl dichloroacetate, decyl dichloroacetate, dodecyl trichloroacetate, phenyl dibromoacetate, tolyl dibromoacetate, xylyl triiodoacetate, cumenyl dichloroacetate, pseudocumenyl dichloroacetate, benzyl dichloroacetate, beta-phenylethyl dichloroacetate, amylphenyl dichloroacetate, hexylphenyl tribromoacetate, etc.

The catalyst for the reaction is palladium cyanide and this catalyst can be employed as a heterogeneous or homogeneous or soluble catalyst. The catalyst can be dissolved in a suitable reaction solvent or dissolved in an excess quantity of the halo acetic acid or acetate ester reactant. When the catalyst is employed in heterogeneous catalysis, it can be suitably distended on an inert solid carrier, e.g., on silica gel, aluminum silicates, molecular sieves, diatomaceous earth, fuller's earth, etc. Preferably the catalyst is employed as a homogeneous catalyst dissolved in the reaction solvent or excess quantities of the halo acetic acid reactant.

As previously mentioned, the preferred reaction solvent comprises an excess quantity of the halo acetic acid or ester thereof. If desired, other organic liquids which are inert under the reaction conditions to the reactants catalysts and products can also be employed. Such solvents include for example various ethers, esters, carboxylic acid amides or saturated hydrocarbons.

Suitable examples of the ethers that can be employed as inert solvents include the alkyl and aryl ethers such as methyl ethyl ether, diethyl ether, diisopropyl ether, ethylene glycol diisoamyl ether, ethylbenzyl ether, diethylene glycol diethyl ether, triethylene glycol diethyl ether, triethylene glycol diethyl ether, tetraethylene glycol dimethyl ether, etc.

Various esters can also be employed as solvents such as methyl acetate, ethyl acetate, isopropyl acetate, ethyl propionate, n-butyl formate, sec-butyl acetate, isobutyl acetate, ethyl n-butyrate, n-butyl acetate, isoamyl acetate, n-amyl acetate, isoamyl n-butyrate, diethyl oxalate, glycol diacetate, isoamyl isovalerate, methyl benzoate, ethyl benzoate, methyl salicylate, n-propyl benzoate, n-dibutyl oxalate, etc. Saturated hydrocarbons and aromatic hydrocarbons can also be used such as pentane, hexane, heptane, octane, decane, dodecane, mineral oil, kerosene, etc., benzene, xylene, toluene, cumene, ethylbenzene, indene, etc.

Various amides and N-substituted amides can also be used as reaction solvents. Examples of such include acetamide, dimethyl acetamide, N-phenyl acetamide, valeramide, caprylamide, etc.

The reaction is performed at relatively mild conditions including temperatures from 30° to 300° C., preferably from 75° to 250° C., and most preferably 100° to 150° C. The pressure employed can be from 1 to 1000 atmospheres, preferably from 10 to 300, and most preferably, from 20 to about 125 atmospheres with the partial pressure of ethylene comprising from 10 to 100 percent of the gas phase. The ethylene, if desired, can be diluted with a suitable inert gas such as carbon dioxide or nitrogen; however, preferably the ethylene is employed undiluted so that unconverted ethylene can be directly recycled to the reaction zone.

The reaction is conducted for several minutes to 12 hours or more to insure complete reaction and this can be determined by monitoring the pressure decline of the reactor or other suitable means, e.g., detection of the formation of a solid high molecular weight acid in the liquid phase.

The reaction can be performed in batch or by continuous processing using conventional techniques. The reactants can be introduced continuously in either batch or continuous fashion and in the batch processing the product can be permitted to accumulate in the reaction zone until a sufficient concentration is developed to warrant discontinuing the reaction and recovery of the product. In continuous processing, a portion of the reaction zone contents can be continuously removed to recover the product therefrom and the remainder including the catalyst and unconverted halo acetic acid and/or solvent can be recycled to further contacting in the reaction zone. The reaction zone contents can be agitated by the introduction of the ethylene into the reaction zone or can be agitated by conventional stirring means.

The product can be recovered by suitable techniques, e.g., distillation under reduced pressures or by filtration of the solid, high molecular weight acid or ester from the reaction medium.

The following example will illustrate a mode of practice of the invention and demonstrate results obtainable thereby:

EXAMPLE

A 300 milliliter capacity bomb is charged with 100 milliliters dichloroacetic acid and ½ gram palladium cyanide. The bomb is closed and pressured to 800 p.s.i.g. with ethylene, then heated to 100° C. and maintained at that temperature for 6 hours while rocking to agitate the contents. The bomb is thereafter cooled, depressured, opened and the contents thereof filtered to recover 4 grams of a solid mixture of fatty acids having a softening point at 140° C. and a melting point of 320° C. The average carbon and hydrogen analysis for the solid is 53.3 percent carbon; 8.5 percent hydrogen; corresponding to the theoretical of 53.6 percent carbon and 8.2 percent hydrogen for dichlorododecanoic acid. The latter identification is consistent with the infrared spectrum of the product.

When the experiment is repeated with the substitution of methylcyclopentyldibromoacetate for the dichloroacetic acid previously used, a similar reaction occurs to prepare the methylcyclopentyl esters of dibromo fatty acids with an average chain length of 12 carbons.

The preceding example is intended solely to illustrate the mode of practice of the invention and to demonstrate results obtainable thereby. It is not intended that the example be construed as unduly limiting of the invention but instead it is intended that the invention be defined by the steps and reagents and their obvious equiqvalents set forth in the following claims:

I claim:
1. The manufacture of halogenated fatty carboxylic acids of even number carbon chains which comprises contacting ethylene with an acid reactant selected from the class consisting of dihalo and trihalo acetic acids and the esters thereof formed from $C_1$ to $C_{12}$ monohydroxy alcohols selected from the class consisting of alkanols, cycloalkanols, phenol and alkylphenols in the presence of a palladium cyanide containing catalyst at a temperature from 30° to 300° C. and a pressure from 1 to 1000 atmospheres to telomerize the ethylene and form said halogenated long-chain fatty acid.

2. The manufacture of claim 1 wherein said acid reactant is dichloroacetic acid.

3. The manufacture of claim 1 wherein said acid reactant is trichloroacetic acid.

4. The manufacture defined in claim 1 wherein said acid reactant is dihalo or trihalo acetic acid.

5. The manufacture of claim 1 wherein said palladium cyanide containing catalyst is dissolved in an inert organic reaction solvent.

References Cited

UNITED STATES PATENTS

| | | | |
|---|---|---|---|
| 3,213,149 | 10/1965 | Takanashi | 260—539X |
| 3,194,800 | 7/1965 | Blackham | 260—94.9 |
| 2,507,568 | 5/1950 | Hanford et al. | 260—408 |

LEWIS GOTTS, Primary Examiner

CATHERINE L. MILLS, Assistant Examiner

U.S. Cl. X.R.

260—539